United States Patent [19]
Schoenman et al.

[11] Patent Number: 5,737,922
[45] Date of Patent: Apr. 14, 1998

[54] CONVECTIVELY COOLED LINER FOR A COMBUSTOR

[75] Inventors: Leonard Schoenman, Citrus Heights; Jerrold E. Franklin, Sacramento, both of Calif.

[73] Assignee: Aerojet General Corporation, Sacramento, Calif.

[21] Appl. No.: 380,777

[22] Filed: Jan. 30, 1995

[51] Int. Cl.⁶ .................................................. F02C 7/12
[52] U.S. Cl. .......................... 60/752; 165/168; 165/908; 415/115
[58] Field of Search ................. 60/262, 266, 39.02, 60/360, 39.37, 752, 754; 165/908, 168, 903; 415/115, 116; 416/95; 431/351

[56] References Cited

U.S. PATENT DOCUMENTS

| | | | |
|---|---|---|---|
| 4,912,931 | 4/1990 | Joshi et al. | 60/732 |
| 5,081,843 | 1/1992 | Ishibashi et al. | 60/733 |
| 5,123,242 | 6/1992 | Miller | 60/226.1 |
| 5,144,795 | 9/1992 | Field | 60/226.1 |
| 5,157,917 | 10/1992 | Liang et al. | 60/226.1 |
| 5,203,163 | 4/1993 | Parsons | 60/226.1 |
| 5,239,823 | 8/1993 | Sims | 60/752 |
| 5,269,135 | 12/1993 | Vermejan et al. | 60/226.1 |
| 5,343,654 | 9/1994 | Lee | 60/752 |
| 5,363,643 | 11/1994 | Halila | 60/752 |
| 5,467,815 | 11/1995 | Haumann et al. | 165/908 |

FOREIGN PATENT DOCUMENTS

| 1481586 | 5/1989 | U.S.S.R. | 165/908 |
|---|---|---|---|

*Primary Examiner*—Charles G. Freay
*Attorney, Agent, or Firm*—Townsend and Townsend and Crew LLP

[57] ABSTRACT

A combustor liner (2) for convectively cooling a combustor chamber (16) in a gas turbine (4) comprises a chamber wall (30) with an array of coolant channels (60) formed therein. Supply manifolds (50) are coupled to the coolant channel inlets for directing bypass air through the channels, where the bypass air removes heat from the chamber wall, and discharge manifolds (52) are coupled to the coolant channel outlets for discharging the heated bypass air to the turbine (10). The coolant channels are spaced and distributed throughout the combustor liner so that the coolant flows through a substantial portion of the liner. The coolant channels are minute channels with relatively short flow paths to minimize both the pressure drop and the quantity of bypass air required to cool the wall. In addition, the channels are completely enclosed within the chamber wall to significantly improve the heat transfer characteristics of the combustor liner. Because the chamber wall is cooled convectively, without bleeding air directly into the combustion chamber, the combustor liner is particularly suited for fuel-rich combustors, such as the first stage of a two stage low NOx combustor.

25 Claims, 5 Drawing Sheets

CONVECTIVELY COOLED LINER FOR A COMBUSTOR

BACKGROUND OF THE INVENTION

This invention relates to combustors generally, and more specifically to a convectively cooled liner for a gas turbine combustor.

In a gas turbine engine, such as those typically used to power aircraft, cogeneration plants, etc., a compressor discharges high pressure compressed air into a combustion chamber where it is mixed with fuel and the mixture burned. The resulting combustion gases drive a turbine which produces work and/or accelerates the gas through a nozzle to produce thrust. During operation, the combustion chamber wall becomes very hot as it is exposed to hot combustion products that generally exceed the safe operating temperature of the standard materials of construction, e.g., super alloys and refractory metals. Therefore, sufficient cooling must be provided to prevent the chamber wall from either melting or deteriorating too rapidly.

To cool the combustion chamber wall, cooler pressurized air from the compressor is typically bled through numerous slots or holes in the chamber wall. The slots are shaped so that the air preferentially flows in along the wall in the flow direction of the combustion gases, thereby forming a protective jacket in the vicinity of the wall. One drawback with this method is that a large amount of air is required to sufficiently cool the chamber wall. In addition, this air coolant must be reduced to the combustion chamber pressure as it passes through the combustion chamber wall. Therefore, a relatively large percentage of the work put into this compressed air by the compressor is used to cool the combustor, which reduces the overall efficiency of the engine.

Recent environmental requirements have placed increased restrictions on the amount of NOx and CO contained in gas turbine exhaust gas. The NOx typically results from high combustion temperatures and excess air and the CO results from low combustion temperatures and insufficient air. These requirements have led to a new, two-stage combustor design. Fuel is initially injected into the primary combustion stage, which operates fuel-rich to create a chemical environment rich in hydrocarbon fragments, thereby reducing the formation of NOx. The exhaust of the primary combustion stage is discharged into a second stage, where substantial amounts of additional air is added so that this stage operates fuel-lean. This design has been found to greatly reduce the level of both NOx and CO generation during combustion.

One drawback with the two-stage combustor design is that the conventional method of cooling, by bleeding compressed air through the combustor wall, does not work in the fuel-rich stage. The air coolant burns rapidly with the fuel-rich combustion gas at the wall, thereby heating rather than cooling the combustor wall. In addition, this air completes the combustion process, thereby defeating the low NOx advantage. Because of these problems, other attempts have been made to increase the allowable wall temperature, such as employing new high-temperature resistant alloy materials for the wall or spraying a thin layer of insulating ceramic thermal barrier coating onto the wall. In spite of these precautions, the high temperatures of the primary combustion stage create local hot spots on the combustor wall, which lead to reduced wall lifetime and localized burn-through or melting of this wall.

What is needed, therefore, is a system for efficiently cooling the combustor chamber wall in a gas turbine. The system should be capable of cooling the wall with a relatively small percentage of the pressurized air from the compressor. In addition, the system should be configured so that the air coolant undergoes a relatively small pressure drop to increase the efficiency of the turbine. Preferably, the system will be suitable for cooling combustor chambers that contain high fuel/air ratios, such as the primary combustion chamber of a two stage low NOx design, without melting the combustor wall or destroying the low NOx advantage of the two stage combustor.

SUMMARY OF THE INVENTION

The present invention is directed to a system and method for convectively cooling a combustor chamber wall surrounding a combustor, such as a gas turbine combustor. The invention provides a combustor liner having an array of coolant channels configured to significantly improve heat transfer characteristics of the liner. The combustor liner minimizes the quantity of air required to cool the chamber wall and minimizes the pressure lost by the air coolant, which increases the overall efficiency of the engine. The invention is particularly suited for fuel-rich combustors, such as the first stage of a two-stage low NOx combustor, because the combustor liner is configured to sufficiently cool the chamber wall without melting it or interfering with the low NOx advantage of the combustor.

The invention comprises a combustor having a casing enclosing a combustion chamber and a combustor liner surrounding at least a portion of the combustion chamber. The combustor liner has a multiplicity of coolant channels formed therein. The channels are arranged transversely relative to the flow direction and distributed over the liner in a substantially uniform manner. Supply manifolds are coupled to the inlets for directing the coolant through the coolant channels, where the coolant picks up heat from the surrounding surfaces of the chamber wall, and discharge manifolds are coupled to the coolant channel outlets for discharging the heated coolant. Precise engineering of the coolant channels provides an effective heat transfer area between the combustor liner and the coolant channels so that the liner can be cooled efficiently, without large pressure losses and without bleeding air directly into the combustion chamber.

The coolant channels are preferably formed with a cross-sectional area substantially less than the cross-sectional area of the supply passages so that the air velocity through the channels is substantially higher than the air velocity in the supply manifolds. This minimizes the quantity of air required to cool the chamber air, thereby allowing more bypass air to be used for other purposes, e.g., quenching, driving the gas turbine or cooling a second stage combustion chamber. The coolant channels also preferably have relatively short flow paths so that the coolant air undergoes a relatively small pressure drop when it passes through these channels, thereby increasing the efficiency of the cooling process.

The discharge and supply manifolds are preferably formed with a plurality of curved support members coupled between a perimetrical wall and the outer surface of the chamber wall. The manifolds are circumferentially spaced around the combustion chamber and extend longitudinally along the combustor liner so that the cool air in the supply manifolds flows parallel with the heated air in the discharge manifolds. In addition, the coolant channels are preferably perpendicular to the hot gas flow direction and arranged in parallel rows to maximize the surface area between the coolant channels and the heated chamber wall, thereby improving the heat transfer characteristics of the combustor liner.

In a preferred configuration, the liner is constructed with multiple platelets, i.e., thin sheets of metal, that are stacked together adjacent to the combustion chamber wall. The platelets have a multiplicity of slots that are arranged to form channels for receiving coolant. An outer platelet or wall has a plurality of openings arranged to form inlets and outlets for each channel. One advantage of this platelet construction is that the coolant channels can be precisely fabricated so that an effective heat transfer area is created between the coolant channels and the chamber wall. In addition, the platelet construction allows the lengths and widths of the channels to be preselected to match individual channel flows to local cooling requirements, thereby avoiding potential hot spots on the combustor wall.

Other features and advantages of the invention will appear from the following description in which the preferred embodiment has been set forth in detail in conjunction with the accompanying drawings.

DESCRIPTION OF THE PREFERRED EMBODIMENTS

Figure 1:
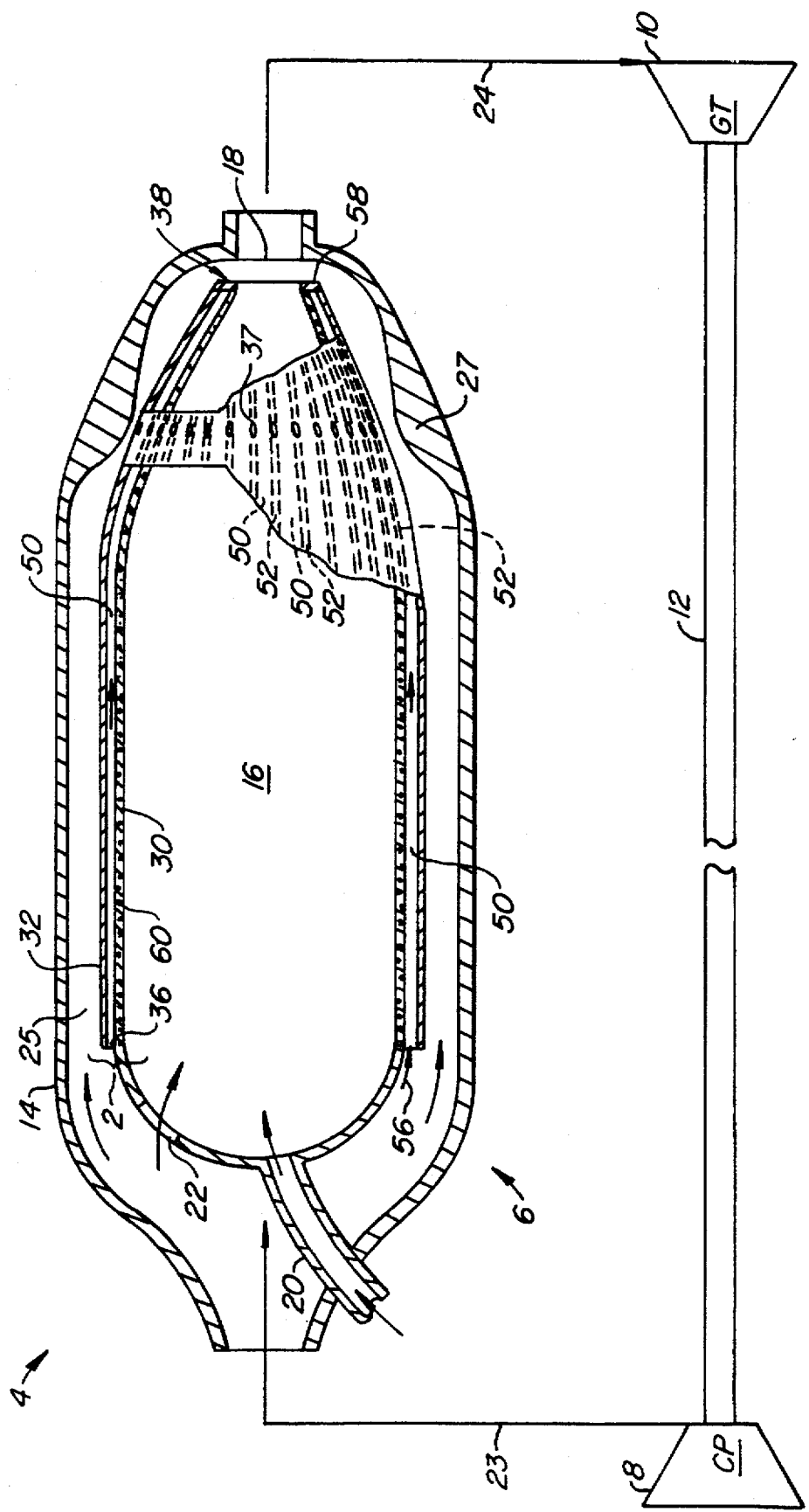
FIG. 1 is a schematic sectional view showing a gas turbine employing a combustor with a liner constructed according to the principles of the present invention.

Referring to the drawings in detail, wherein like numerals indicate like elements, a gas turbine combustor liner 2 is illustrated according to the principles of the invention. It should be understood, however, that although combustor liner 2 is shown and described as part of a particular combustor in a particular gas turbine, it is not intended to be limited in that manner. That is, liner 2 can be used with other combustors and in other systems, such as an annular combustor in a turbine jet engine, cylindrical, conical or other types of combustors in gas turbine plants (e.g., cogeneration), or either the fuel-rich or fuel-lean chambers of a dual stage combustor. Alternatively, liner 2 may be used in conjunction with a combustor in chemical processing applications or other applications in which fuel and an oxidizer produce an exothermic reaction with sufficient energy to melt the combustor wall.

Referring to FIG. 1, a gas turbine engine 4 comprises a combustor 6 in fluid communication with a compressor 8 and a gas turbine 10, which are mounted together on a coaxial shaft 12. Fuel is supplied to and burnt or combusted with air from compressor 8 in the combustor and then burnt gas is supplied to gas turbine 10 to drive the compressor and provide engine power and/or thrust. Combustor 6 includes a outer casing 14 and a combustion chamber wall 30 which houses a primary combustion chamber 16 and a transition or dilution chamber 18. Fuel and compressed air are supplied to primary combustion chamber 16 through a fuel injection nozzle 20 and a combustion air inlet 22. Of course, the invention may utilize a plurality of combustion air inlets and fuel injection nozzles circumferentially spaced from each other, if desired. In addition, combustor 6 may include other conventional inlets, such as minute air inlets for introducing swirler air into the upstream portion of primary combustion chamber 16.

The air from compressor 8 passes along a conduit 23 through air inlet 22 into primary combustion chamber 16, where it is mixed with fuel and the mixture burned. The resulting combustion gases pass through dilution chamber 18 and into turbine 10 along a discharge line 24. A portion of the air from compressor 8 bypasses air inlet 22 and either passes through combustor liner 2 (i.e., coolant air) or through a generally annular bypass passage 25 between liner 2 and casing 14 (i.e., bypass air), as is discussed in more detail below. Casing 14 preferably includes a generally annular flow restrictor or nozzle 27 near the downstream end of bypass passage 25 (the purpose of nozzle 27 will be discussed below). The bypass and coolant air mix rapidly and burn with the fuel-rich combustion gases in dilution chamber 18 and the gas mixture drives turbine 10. Of course, it will be noted that combustor 6 may have a variety of different configurations that are conventional to the art. For example, primary combustion chamber 16 may be the first stage or fuel-rich stage of a multi-stage combustor, such as one configured to reduce NOx emissions. In this case, the combustion gases and the bypass and coolant air would pass from combustion chamber 16 into a quench zone and then into the second stage or fuel-lean chamber to complete combustion of the excess fuel from the first stage.

As shown in FIG. 1, combustor liner 2 forms a portion of combustion chamber wall 30. Of course, liner 2 may form the entire combustion chamber wall or a number of separated portions of the wall depending on the local cooling requirements of combustor 6. Combustor liner 2 further includes an outer wall 32 and a plurality of coolant distribution supply and discharge manifolds 50 and 52 formed between outer wall 32 and combustion chamber wall 30. Supply and discharge manifold passages 50, 52 are spaced circumferentially around combustor 6 and generally extend longitudinally from an upstream end 36 to a downstream end 38 of combustor liner 2. Supply and discharge passages 50, 52 are fluidly coupled to each other by a multiplicity of coolant channels 60 oriented transversely to passages 50, 52 (see FIGS. 2–4). Discharge passages 52 have radially disposed outlets 37 for discharging coolant into bypass passage 25 adjacent nozzle 27 so that the coolant air can rejoin the bypass air, as discussed below.

Combustion chambers typically operate at temperatures between about 1500° to 2000° C., which could melt or quickly erode the inner surface of combustion chamber wall 30. To cool chamber wall 30 during operation of the gas turbine, a portion of the air from compressor 8 is diverted through combustor liner 2, as shown by the arrows in FIG. 1. The air flows through combustor liner 2 and extracts heat from chamber wall 30, thereby cooling the inner surface of the wall and heating the air. Because the relatively narrow supply and discharge manifolds 50, 52 and coolant channels 60 present a larger flow resistance than bypass passage 25, a low pressure region must be created in order to draw some of the bypass air through supply manifolds 50 and thereby overcome the tendency of all or most of this air to flow through the larger bypass passage 25. To accomplish this, nozzle 27 restricts the cross-sectional area of bypass passage 25 adjacent the outlets 37 of discharge manifolds 52. This increases the velocity of the air in bypass passage 25, thereby creating a reduced static pressure region. The reduced static pressure region draws the coolant air through supply and discharge manifolds 50, 52 and outlets 37, where it mixes with the bypass air. The mixed air is then diffused downstream of nozzle 27 (discussed below) to lower the velocity and recover the energy as an increase in static pressure, before it combines with the combustion gases exiting primary combustion chamber 16 in dilution chamber 18.

Of course, the invention is not limited to the above configuration and it will be recognized by one skilled in the art that other means can be used to direct flow through the coolant passages. For example, other types of flow restrictors may be incorporated into bypass passage 25 or the flow resistance of bypass passage 25 may be increased so that more of the bypass air tends to flow into discharge and supply manifolds 50, 52 and coolant channels 60. Alternatively, combustor 16 may be constructed without a bypass passage 25. In this case, the casing would form part of the combustor wall so that all of the bypass air would pass through discharge and supply manifolds 50, 52 and coolant channels 60.

Figure 2:
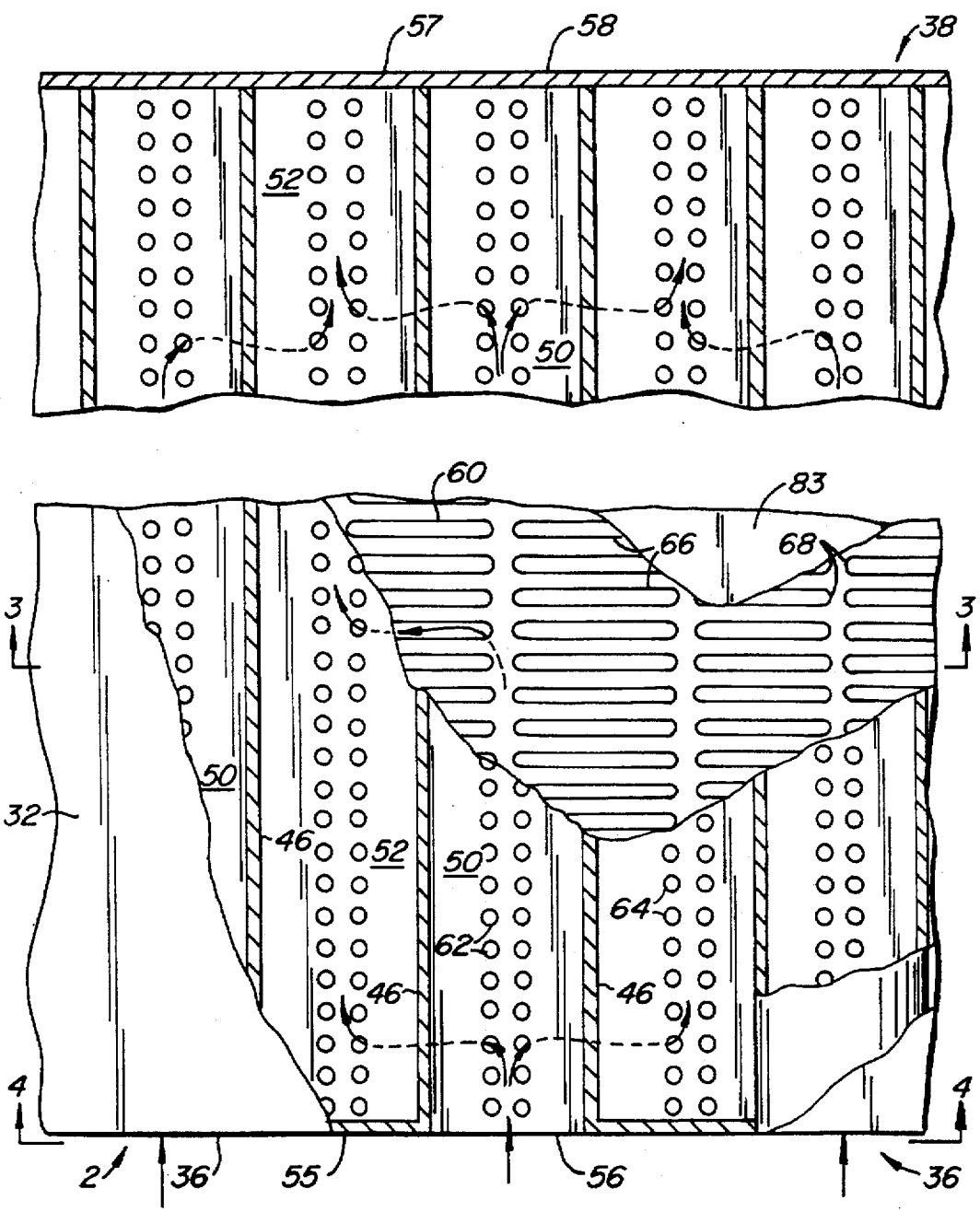
FIG. 2 is a top view of the combustor liner of FIG. 1 that is partially cut away to illustrate coolant channels and supply and discharge manifolds within the liner.
Figure 3:
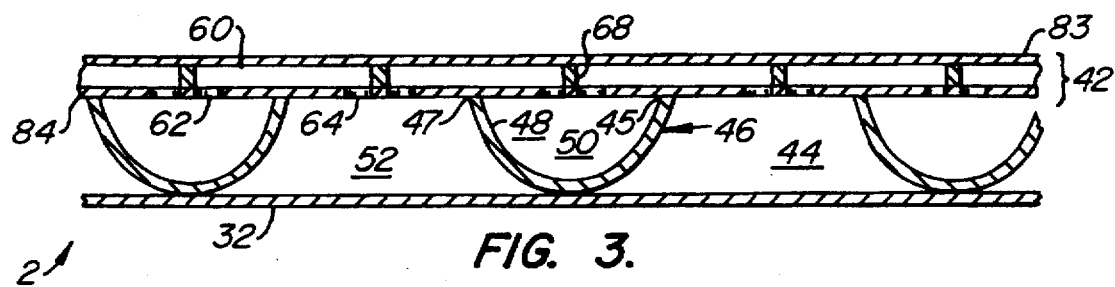
FIG. 3 is a sectional view of the combustor liner of FIG. 2 taken along line 3—3.
Figure 4:
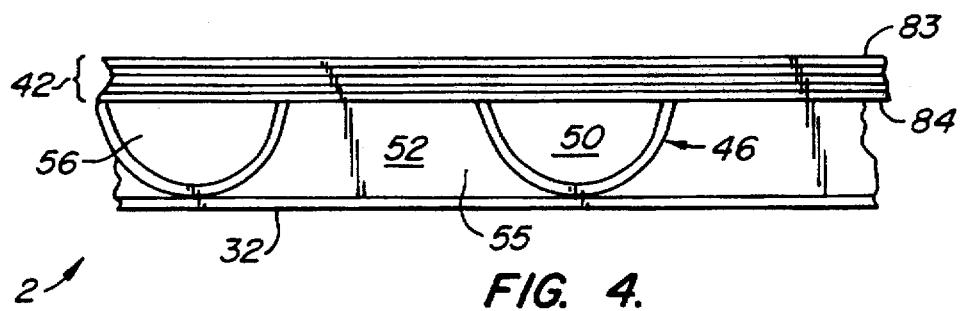
FIG. 4 is an end view of the combustor liner of FIG. 2 taken along line 4—4.

FIGS. 2–4 show the preferred construction of combustor liner 2. As shown in FIG. 3, liner 2 comprises outer wall 32 and a core 42, which forms chamber wall 30 of combustor 6 (FIG. 1). In the preferred configuration, outer wall 32 and core 42 will have a generally circular shape to correspond with the partially cylindrical, partially conical shape of combustor 6, as shown in FIG. 1. Of course, one skilled in the art will readily recognize that combustor liner 2 can have a variety of configurations, depending on the shape of combustor 6. Outer wall 32 and core 42 define a generally open space 44 therebetween and are coupled together by a plurality of support members 46 that extend longitudinally through liner 2 from upstream end 36 to downstream end 38.

FIG. 2 illustrates outer wall 32, a first cut away portion that shows support members 46 and a second cut away portion that illustrates the interior of core 42. As shown in FIG. 3, support members 46 are preferably arcuate or channel-shaped walls having convex inner surfaces 48 and two end portions 45, 47 coupled to core 42. With this configuration, support members 46 define discharge manifolds 52 between adjacent support members 46 and supply manifolds 50 between support members 46 and core 42, as shown in FIG. 2. The discharge and supply manifolds 52, 50 are alternately spaced around the circumference of combustor 6 to form axial circumferential fluid conduits to enable the passage of coolant air through combustor liner 2, as discussed above. The manifolds may have different configurations from that described, such as helical, spiral or a combination. Preferably, support members 46 are continuous from upstream end 36 to downstream end 38 so that air flowing through supply manifolds 50 will not pass directly into discharge manifolds 52 and vice versa.

Referring to FIGS. 2 and 4, supply manifolds 50 each have inlets 56 at the upstream end 36 of liner 2 for receiving a portion of the compressed air from compressor 8 (coolant air) and closed ends 58 at the downstream end 38. Discharge manifolds 52 each have closed ends 55, 57 at both the upstream and downstream ends 36, 38 of liner 2 and outlet 37 therebetween for discharging the coolant air into bypass passage 25 (see FIG. 1 and note that outlets 37 are not shown in FIG. 2). As shown in FIGS. 2 and 3, core 42 has a multiplicity of coolant channels 60 formed therein for cooling chamber wall 30. Each coolant channel 60 has an inlet 62 fluidly coupled to one of the supply manifolds 50 and an outlet 64 fluidly coupled to one of the discharge manifolds 52. As low velocity bypass air passes through supply manifolds 50, a small portion of the air is withdrawn through each inlet 62 and metered through coolant channels 60 to extract heat from core 42 (i.e., combustion chamber wall 30). The air then exits coolant channels 60 through outlets 64 into discharge manifolds 52, where it flows, in a parallel direction with the air in supply manifolds 50, through outlets 37 and into bypass passage 25 (see FIG. 1).

In a preferred configuration, outlets 37 of discharge manifolds 52 are located slightly upstream of downstream end 38 of liner 2, as shown in FIG. 1. With this configuration, nozzles 27 can also be disposed slightly upstream of downstream end 38 so that the bypass and coolant air is recombined and kinetic energy recovered in a diffuser before entering dilution chamber 18. In order to cool the portion of liner 2 downstream of outlets 37, supply and discharge manifolds 50, 52 continue past outlets 37 to downstream end 38. Some of the coolant air in supply manifolds 50 (i.e., the air that has not already been drawn through coolant channels 60 located upstream of outlets 37) flows past the position of the outlets 37, through supply manifolds 50 to coolant channels 60 located downstream of outlets 37 and then backwards through discharge manifolds 52 to outlets 37. Thus, heated, coolant air in discharge manifolds 52 flows towards outlets 37 from both sides and is then drawn through outlets 37 by the low static pressure region adjacent nozzle 27, as discussed above.

The coolant and bypass air are recombined by conventional momentum exchange methods which allows most of the pressure loss to be recovered. In the preferred embodiment, nozzle 27 expands in the downstream direction, thereby diffusing the air downstream of nozzle 27. This helps to increase the static pressure (because the air is slowing down) and mixes the bypass and coolant air together. The recombined air can be used to provide more power to turbine 10 because it still retains energy from compressor 8. Alternatively, this air may be used for other purposes such as cooling other components of gas turbine engine 2. If the engine includes a second stage combustor (not shown), such as a fuel-lean combustor for reducing NOx and CO emissions, for example, the unused bypass air will exit the first stage at a pressure suitable for cooling the second stage or for combusting with fuel in the second chamber.

As shown in FIG. 2, coolant channels 60 have small cross-sectional areas relative to the cross-sectional areas of supply and discharge manifolds 50, 52. Preferably, the cross-sectional area of coolant channels 60 is about 0.001 to 0.5 in$^2$ (about 0.0065 to 3.23 cm$^2$) and more preferably about 0.002 to 0.01 in$^2$ (about 0.013 to 0.065 cm$^2$). This causes the bypass air flowing into coolant channels 60 to increase in velocity, thereby increasing the rate of convective heat transfer between chamber wall 30 and the air. This increased rate of heat transfer minimizes the quantity of air required to cool chamber wall 30. In addition, the containment of the cooling air in a four sided enclosed channel increases the effective heat transfer surface area, thereby enhancing the efficiency of the coolant. Therefore, only a small portion of the overall quantity of the air that bypasses combustion chamber 16 is needed to cool chamber wall 30.

As shown in FIGS. 2 and 3, coolant channels 60 have a short flow path relative to the length of supply and discharge manifolds 50, 52, preferably having a length of about 0.1 to 10 inches (about 0.25 to 25 cm) and more preferably about 0.5 to 1.5 inches (about 1.25 to 3.75 cm). This minimizes the pressure loss across each channel, thereby increasing the efficiency of the cooling process while minimizing the frictional pressure loss. As discussed above, this allows the compressed bypass air to be utilized for other purposes within gas turbine engine 4. Each row of channels has one discharge 52 and supply manifold 50 coupled to the inlets 62 and outlets 64, respectively, of the channels 60 within the row. It should be noted, however, that coolant channels 60 can have different configurations that would be apparent to one of ordinary skill in the art. For example, coolant channels 60 can have multiple bends to minimize the cooling flow or simples curves to minimize the pressure drop through the channels.

Channels 60 are preferably arranged in axially aligned rows (i.e., rows running parallel to the combustor axis or flow direction), as shown in FIG. 2. The coolant channels 60 are parallel to each other and oriented transversely, e.g., perpendicular, to the flow direction. Channels 60 have longitudinal sidewalls 66 and opposite ends 68. Channels 60 are spaced close together and preferably have a distance of 0.005 to 0.5 inches (0.0125 to 1.25 cm), and more preferably 0.03 to 0.1 inches (0.075 to 0.25 cm), between sidewalls 66 of adjacent channels 60. Similarly, there is preferably about 0.03 to 0.1 inches (0.075 to 0.25 cm) between ends 68 of adjacent channels 60 (i.e., between adjacent rows). Spacing the channels close together and distributing them throughout the entire liner 2 facilitates heat transfer between the coolant air and the liner and helps to ensure that essentially the entire combustor liner 2 is exposed to coolant flowing through channels 60. This also provides a generally uniform cooling of liner 2 so that local areas of the liner do not overheat.

Figure 5:
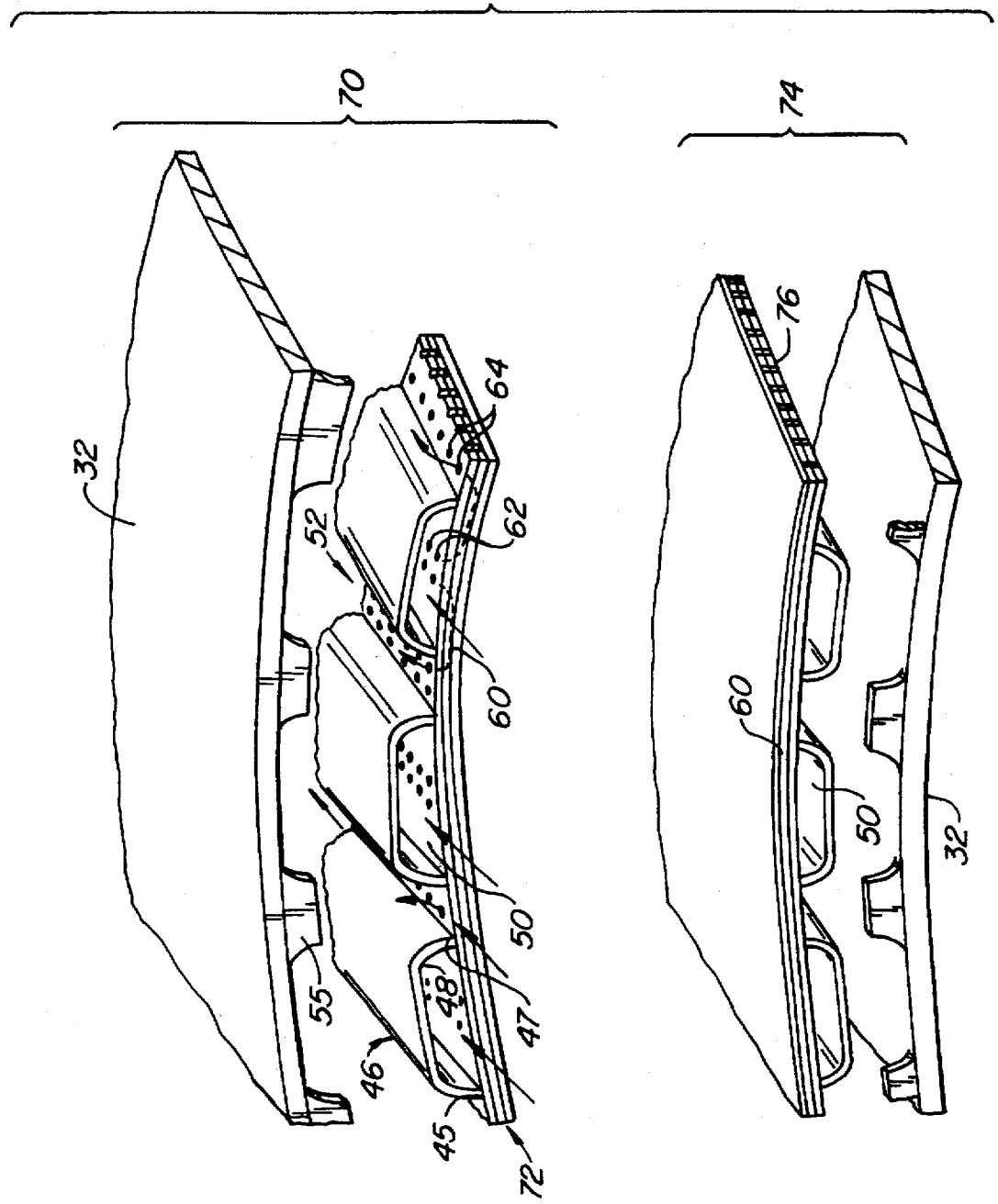
FIG. 5 is an exploded perspective view of an alternate embodiment of the combustor liner of FIG. 1 adapted for use with an annular combustor.

FIG. 5 illustrates an alternative embodiment of combustor liner 2 that is adapted for use with an annular combustor, such as a combustor surrounding the turbine shaft in a jet engine. In this embodiment, combustor liner 2 has an outer shroud 70 for cooling an outer wall 72 of combustor 6 and an inner shroud 74 for cooling an inner wall 76 of the combustor. Inner and outer shrouds 74, 70 each have the same construction as the combustor liner described in the preferred embodiment. As shown in FIG. 5, bypass air from the compressor passes through supply manifolds 50 in both shrouds 70, 74. A portion of the air is withdrawn through coolant channels 60 to convectively cool inner and outer walls 72, 76 of the combustor and then collected in discharge manifolds 52, where it is discharged and mixed with the combustion gases as described above.

Figure 6:
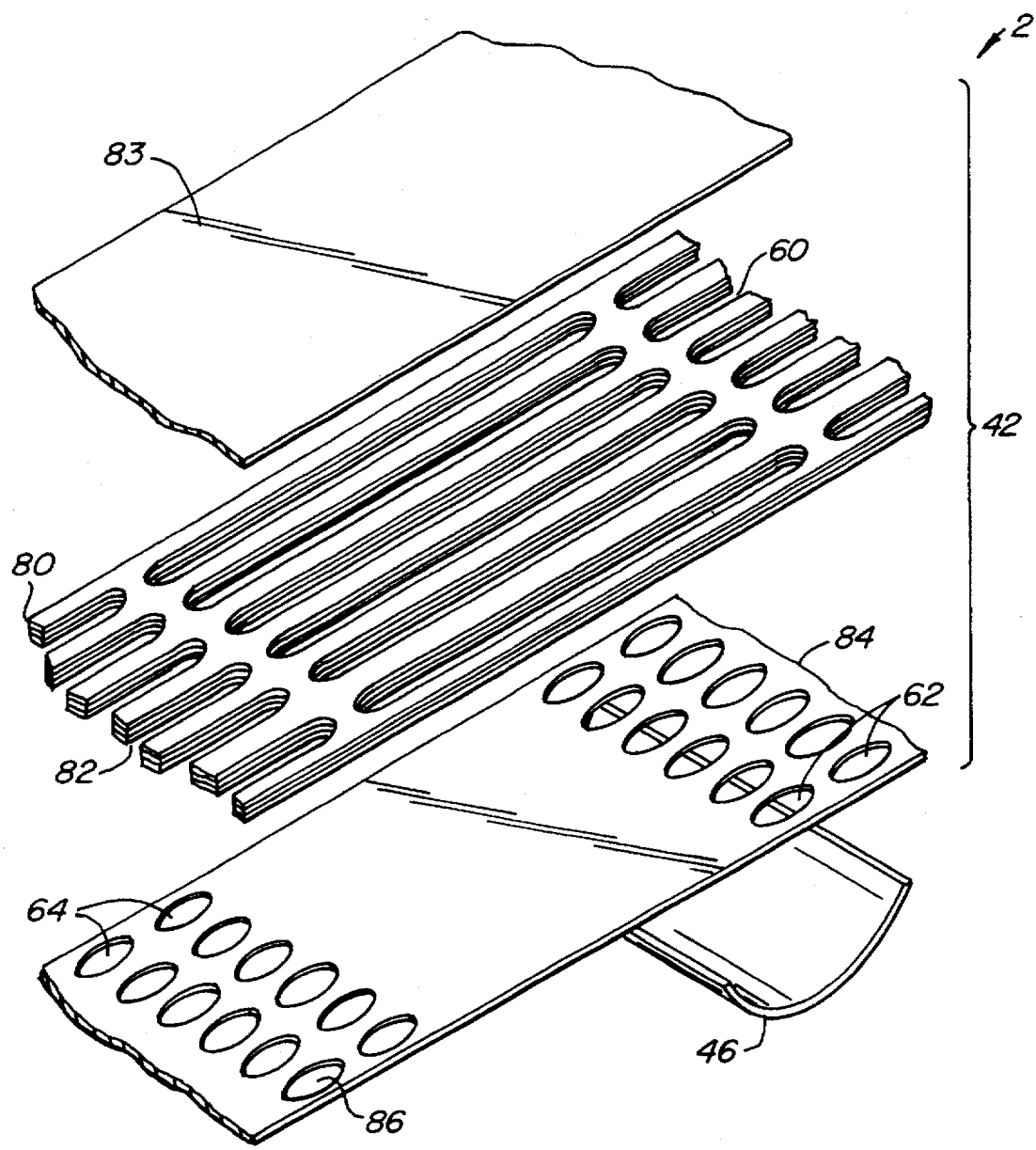
FIG. 6 is an exploded view of a combustor liner constructed with platelet technology according to the principles of the present invention.

Referring to FIG. 6, combustor liner 2 will be described in greater detail. Core 42, which essentially forms chamber wall 30 (shown in FIG. 1), includes a multiplicity of coolant channels 60 disposed therein to maximize heat transfer from the bypass air to the chamber wall. To facilitate manufacture of these channels, liner 2 is preferably formed using platelet construction. In the preferred embodiment, liner 2 generally comprises a stack of platelets 80, 83 and 84 that have been joined together in any of a variety of ways, such as lamination, diffusion bonding or brazing. Diffusion bonding involves hot-pressing platelets 80, 83 and 84 together at elevated temperatures, thereby generating a monolithic structure with properties of the parent material.

Platelets 80, 83 and 84 are thin sheets of material, such as a metal foil or sheet or ceramic material in the form of green tape. Preferably, the platelet thicknesses will fall within the range of about 0.003 to 0.3 inches (0.0075 to 0.75 cm), and more preferably about 0.01 to 0.05 inches (0.025 to 0.125 cm). The stack of platelets will have a thickness which is preferably about 0.005 to 1.0 inches (0.0125 to 2.5 cm) and more preferably about 0.05 to 0.5 inches (0.125 to 1.25 cm). Platelets 80, 83 and 84 can all be formed of the same material or each one can be formed of a different material, selected for a specific physical attribute such as thermal expansion, thermal conductivity, oxidation resistance, etc. As shown in FIG. 6, each platelet 80, 83 and 84 has a multiplicity of slots 82 formed in parallel rows along the platelet. Slots 82 are stamped, punched, chemically etched, or laser cut into each platelet 80 before the platelets 80 are bonded together. The platelets are stacked together so that the desired network or flowpath is formed through the stack. This construction permits precision fabrication of the coolant channels.

As shown in FIG. 6, an interior platelet 83 is laminated on one side of the stack of platelets 80 and an end platelet 84 is laminated to the other side. End platelet 84 has a plurality of holes 86 formed therein and is stacked with the other platelets 80 so that holes 86 are aligned with slots 82 to form inlets 62 and outlets 64 on either end of each coolant channel 60. Support members 46 are then attached to end platelet 84 so that each support member 46 encloses two rows of holes (i.e., inlets 62) to form supply manifolds 50. The adjacent rows of holes (outlets 64) remain open and outer wall 32 (shown in FIGS. 3 and 4) is coupled to support members 46 to form discharge manifolds 52 between support members 46. Support members 46 and outer wall 32 may be attached to the stack of platelets by a variety of conventional methods such as brazing, welding or diffusion bonding.

One of the advantages of the preferred platelet construction is that interior platelet 83 can have a relatively small thickness, on the order of about 0.001 to 0.1 inches (0.0025 to 0.25 cm). With this configuration, the air coolant flowing through coolant channels 60 is extremely close to the inner surface of interior platelet 83, which is the closest portion of chamber wall 30 to the combustion gases and, therefore, typically the hottest portion of the wall. Another advantage of the platelet construction is that the coolant channels 60 are surrounded on all four sides by core 42. This maximizes the heat transfer surface area, thereby minimizing the quantity of air required to cool the chamber wall.

In the preferred configuration, each coolant channel 60 has approximately the same cross-sectional area to provide uniform cooling of chamber wall 30. However, local regions of the combustor may become hotter than other regions, requiring variations in cooling. Accordingly, coolant channels 60 can have preselected different lengths and cross-sections to match individual channel flows with local cooling requirements. The platelet technology of the present invention facilitates precise fabrication of different sized coolant channels. Slots 82 can be formed into each platelet 80 so that coolant channels 60 have different widths and/or lengths to provide varied cooling to the combustor.

The above is a detailed description of various embodiments of the invention. It is recognized that departures from the disclosed embodiments may be made within the scope of the invention and obvious modifications will occur to a person skilled in the art. The full scope of the invention is set out in the claims that follow and their equivalents. Accordingly, the claims and specification should not be construed to unduly narrow the full scope of protection to which the invention is entitled.

What is claimed is:

1. A combustor comprising:
   a casing enclosing a combustion chamber for flow of combustion gases along a hot gas flow direction; and a combustor liner surrounding at least a portion of the combustion chamber and having coolant channels formed therein, the coolant channels arranged transversely relative to the hot gas flow direction and distributed over the combustor liner in a substantially uniform manner, each said coolant channel terminating at one end in an inlet and at the other end in an outlet;

a supply flow passage common to a plurality of said coolant channels and in fluid communication therewith through said inlets;

a discharge flow passage common to a plurality of said coolant channels and in fluid communication therewith through said outlets; and means for directing coolant into said supply flow passage.

2. The combustor of claim 1 wherein the coolant channels each have opposite sidewalls, the sidewalls of adjacent coolant channels being spaced apart by a distance of about 0.01 to 0.1 inches.

3. The combustor of claim 1 wherein the coolant channels each have opposite ends, the ends of adjacent coolant channels being spaced apart by a distance of about 0.01 to 0.1 inches.

4. The combustor of claim 1 further including a plurality of arcuate support members each having first and second ends coupled to the outer surface of the combustor liner to form a plurality of longitudinal supply chambers between the support members and the chamber wall, the supply chambers being in fluid communication with the coolant channel inlets.

5. The combustor of claim 4 further including a perimeter wall stacked against the arcuate support members so as to define a plurality of longitudinal discharge chambers between adjacent support members, the discharge chambers being in fluid communication with the coolant channel outlets.

6. The combustor of claim 5 wherein the supply and discharge chambers are circumferentially spaced around the combustion chamber.

7. The combustor of claim 5 wherein the supply and discharge chambers have longitudinal axes that are generally parallel to the hot gas flow direction and the coolant channels are generally perpendicular to the flow direction.

8. The combustor of claim 1 wherein the coolant channels each have a cross-sectional area substantially less than a cross-sectional area of the supply flow passage.

9. The combustor of claim 1 wherein the coolant channels each have cross-sectional dimensions of about 0.002 to 0.01 square inches.

10. The combustor of claim 1 wherein each coolant channel has a length from the inlet to the outlet, the coolant channel length being substantially less than a length of the supply flow passage.

11. The combustor of claim 10 wherein the coolant channel length is about 0.5 to 1.5 inches.

12. The combustor of claim 1 wherein the combustor liner includes heat transfer surfaces that completely enclose a substantial portion of the coolant channels.

13. The combustor of claim 1 wherein the combustor liner has inner and outer surfaces, the coolant channel inlets and outlets extending through the outer surface of the combustor liner so that coolant can be directed through the coolant channels to convectively transfer heat between the combustor liner and the coolant without directing the coolant completely through the combustor liner and into the combustion chamber.

14. A combustor comprising:

a casing enclosing a combustion chamber having a longitudinal axis;

a combustor liner surrounding at least a portion of the combustion chamber and comprising multiple platelets stacked together, each platelet having a perimeter side surface and a multiplicity of slots spaced inward therefrom, the platelets being arranged so that the slots are aligned to form a multiplicity of coolant channels, the channels each having an inlet adapted for coupling to a source of coolant and an outlet adapted for discharging the coolant, the combustor liner including an inner wall having an outer surface and being stacked with the platelets so that the outer surface contacts one of the platelets; and means for directing coolant into said coolant channel inlets.

15. The combustor of claim 14 wherein the inner wall is a platelet having a thickness of about 0.01 to 0.05 inches.

16. The combustor of claim 14 further including an outer platelet having a plurality of inlet and outlet openings, the outer platelet being coupled to one of the platelets opposite from the inner wall and being arranged so that one of the inlet openings and one of the outlet openings are aligned with each of the coolant channels.

17. The combustor of claim 16 further including a plurality of arcuate support walls each having first and second ends coupled to the outer platelet to form longitudinal supply chambers between the support walls and the outer platelet, the supply chambers being in fluid communication with the inlet openings of the outer platelet.

18. The combustor of claim 17 further including a perimetrical wall stacked against the arcuate support walls so as to define a plurality of longitudinal discharge chambers between adjacent support walls, the discharge chambers being in fluid communication with the outlet openings of the outer platelet.

19. The combustor of claim 16 wherein the inlet openings each have an area substantially less than a cross-sectional area of the supply chambers.

20. The combustor of claim 17 wherein the coolant channels each have a length from the inlet to the outlet, the coolant channel lengths being substantially less than a length of the discharge chambers.

21. The combustor of claim 14 wherein the combustor liner has an arcuate cross-sectional shape.

22. The combustor of claim 14 wherein the combustion chamber has an annular cross-sectional shape and the combustor liner forms an outer boundary of the annular combustion chamber, the combustor further including a second combustor liner forming an inner boundary of the annular combustion chamber, the second combustor liner comprising inner and outer surfaces and a multiplicity of coolant channels formed therein, the coolant channels having inlets and outlets facing away from the outer surface of the second combustor liner.

23. A method for cooling a combustion chamber liner surrounding a combustion chamber in a gas turbine, the chamber having a longitudinal axis, the method comprising the steps of:

introducing compressed air into a plurality of supply manifolds spaced circumferentially around the combustion chamber and generally parallel to the longitudinal axis;

directing the compressed air flowing through the supply manifolds through a multiplicity of coolant channels formed within the combustion chamber wall transverse to the longitudinal axis;

withdrawing heat from the combustion chamber wall with the compressed air passing through the coolant channels;

accelerating the compressed air through the coolant channels by selecting a cross-sectional area of the coolant channels that is less than a cross-sectional area of the supply manifolds, said coolant channels each having a cross-section of about 0.001 to 0.01 in$^2$; and directing the compressed air into discharge manifolds spaced circumferentially around the combustion chamber and generally parallel to the longitudinal axis.

24. A method for cooling a combustion chamber liner surrounding a combustion chamber in a gas turbine, the chamber having a longitudinal axis, the method comprising the steps of:

introducing compressed air into a plurality of supply manifolds spaced circumferentially around the combustion chamber and generally parallel to the longitudinal axis;

directing the compressed air flowing through the supply manifolds through a multiplicity of coolant channels formed within the combustion chamber wall transverse to the longitudinal axis;

withdrawing heat from the combustion chamber wall with the compressed air passing through the coolant channels;

directing the compressed air into discharge manifolds spaced circumferentially around the combustion chamber and generally parallel to the longitudinal axis; and creating a low static pressure region at outlets of the discharge manifolds to draw the compressed air into the supply manifolds and through the coolant channels and discharge manifolds.

25. A combustor comprising:

a casing enclosing a combustion chamber for flow of combustion gases along a hot gas flow direction; and a combustor liner surrounding at least a portion of the combustion chamber and having coolant channels formed therein, the coolant channels arranged transversely relative to the hot gas flow direction and distributed over the combustor liner in a substantially uniform manner, each said coolant channel terminating at one end in an inlet and at the other end in an outlet; and a supply flow passage common to a plurality of said coolant channels and in fluid communication therewith through said inlets;

wherein said coolant channels have a smaller cross-section than said supply flow passage such that coolant is accelerated through the coolant channels, said coolant channels each having a cross-section of about 0.001 to 0.01 in$^2$.

* * * * *